(12) United States Patent
van der Pol

(10) Patent No.: US 7,054,602 B2
(45) Date of Patent: May 30, 2006

(54) CALIBRATING METHOD AND APPARATUS IN A TELECOMMUNICATION SYSTEM

(75) Inventor: Harry van der Pol, Hengelo (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 549 days.

(21) Appl. No.: 09/771,977

(22) Filed: Jan. 30, 2001

(65) Prior Publication Data
US 2001/0012770 A1    Aug. 9, 2001

(30) Foreign Application Priority Data
Jan. 31, 2000  (SE)  .................................. 0000309

(51) Int. Cl.
H04B 17/00    (2006.01)
(52) U.S. Cl. .................. 455/226.1; 455/67.11; 455/232.1; 455/127.1
(58) Field of Classification Search ............ 455/226.1, 455/226.2, 226.3, 226.4, 296, 278.1, 67.11, 455/67.12, 67.13, 341, 232.1, 310, 67.14, 455/234.1, 149
See application file for complete search history.

(56) References Cited

U.S. PATENT DOCUMENTS

| 3,506,915 | A | * | 4/1970 | Pastori et al. ............ 455/234.1 |
| 3,898,452 | A |   | 8/1975 | Hertel |
| 4,006,420 | A | * | 2/1977 | Schittko ................... 455/226.4 |
| 4,031,469 | A | * | 6/1977 | Johnson ..................... 342/351 |
| 4,160,211 | A | * | 7/1979 | Wittrock ................... 455/226.4 |
| 4,491,783 | A |   | 1/1985 | Sawayama et al. |
| 4,521,861 | A | * | 6/1985 | Logan et al. ................ 342/351 |
| 4,531,235 | A | * | 7/1985 | Brusen ..................... 455/226.2 |
| 5,083,304 | A |   | 1/1992 | Cahill |
| 5,608,331 | A | * | 3/1997 | Newberg et al. .......... 455/67.13 |
| 5,724,653 | A | * | 3/1998 | Baker et al. ................ 455/296 |
| 6,385,441 | B1 | * | 5/2002 | Takakusaki .............. 455/226.1 |
| 6,763,227 | B1 | * | 7/2004 | Kramer ..................... 455/67.11 |

FOREIGN PATENT DOCUMENTS

| EP | 0793292 | 9/1997 |
| EP | 0844485 | 5/1998 |
| GB | 2310780 | 9/1997 |
| WO | WO95/19574 | 7/1995 |

* cited by examiner

*Primary Examiner*—Lana Le
(74) *Attorney, Agent, or Firm*—Roger Burleigh

(57) ABSTRACT

The present invention relates to a calibration arrangements and, in particular, calibration arrangements in an antenna receiver included in a radio base station. The receiver (1) comprises an antenna (300) with one or more amplifiers (100, 200) located in a chain, wherein the noise ($N_a+N_i$) produced by the amplifier/amplifiers (100, 200) can be a reference value during estimation of the gain (G) of the receiver (1). Signal loss due to aging of the components and ambient variations as e.g., temperature can be compensated. An advantage of the present invention is that an external reference source when calibrating the gain of a receiver can be avoided.

30 Claims, 2 Drawing Sheets

CALIBRATING METHOD AND APPARATUS IN A TELECOMMUNICATION SYSTEM

This application claims priority under 35 U.S. C. §§ 119 and/or 365 to 0000309-5 filed in Sweden on Jan. 31, 2000; the entire content of which is hereby incorporated by reference.

TECHNICAL FIELD OF THE INVENTION

This invention relates to a calibration method and arrangements and, in particular, calibration in an antenna receiver included in a radio base station.

DESCRIPTION OF RELATED ART

Radio systems are in use throughout the world transmitting telecommunications signals to radio receivers. In order to meet the capacity demand within the available frequency band allocation, radio operators divide a geographic area to be covered by cells. At the center of each cell there is a transceiver in a base station, which broadcasts radio signals. The available operating frequencies are distributed among the cells such that adjacent cells do not reuse the same group of operating frequencies, in order that co-channel interference is maintained at a tolerable level.

When a new radio system is initially deployed, operators are often interested in maximizing the downlink range (base station broadcast range). Any increase in range means that fewer cells are required to cover a given geographic area, hence reducing the number of base stations and associated infrastructure costs. The antenna used at the radio base station site can potentially make significant improvements to the range and capacity of a radio system. Associated with this requirement is the need to ensure that received signals are processed with the least amount of distortion and loss. At the masthead of the base station, signals from the antenna pass through a filter and a duplexer and then through cabling to receive electronics, where the signal is amplified. Some antennas have associated receive amplifiers which boost the signal prior to further signal degradation on passing through the cabling as the signals are transmitted to the base station electronics unit. At this point the received signal is ideally above a particular level.

In the cases where receive amplifiers are situated adjacent to the antennas, the amount of gain needs to be accurately determined. The signal strength received is normally measured by measurement at the time of installation in order to guarantee a receive level in the base station arrangement. There is a gain variation at the amplifiers and there is a loss through the duplexer. Further losses arise due to the cabling, with variations in temperature and also variations which occur from one batch to another in respect of equipment employed. Losses due to frequency variations are, however, negligible in relation to variation in cable length which can be large considerable. The variation in is dependent on arises from the position of an antenna on a mast, which can typically be 10 meters to 100 meters in height. Base station control electronics are normally situated at the bottom of the mast since that is normally convenient, but it may be located 20 meters away, for instance, by a convenient power source or for protection against vandals. Such losses need not be considered in relation to the transmit path since there is typically a feedback link which keeps the output constant with power detectors, couplings at the antenna and they then feed back a signal digitally down to the base station.

For a specific installation the variables of temperature, frequency and length can be taken into account by specific circuitry, but operational variations for the components at the antenna cannot be taken into account, since these variables are outside the dynamic range of the base station.

These have to be monitored on an individual basis, and are taken into account on installation. In practice a variable gain block is provided which allows the signal received to be adjusted to a certain level which is consistent with the amount of loss associated with the system. In some systems a noise source is placed up the masthead and the system is characterized with reference to this source. Furthermore, any method using/incorporating a reference level at the masthead is susceptible to further problems arising from extra equipment, which consumes electricity, generates heat and will also reduce the reliability potential since it exists as an extra component. The signal source needs to be very stable over a wide temperature range (minus 40 DEG to plus 80 DEG C.), tends to be expensive and is typically only used once.

The power loss caused by the cabling up to the masthead can accordingly be determined and the loss due to the cabling can be compensated by appropriate adjustment of the gain of the receive amplifier.

It is previously known, see for example EP0793 292, A1, that a noise meter monitors a noise signal received from a front-end receiving amplifier in a given channel and compares this with noise from a reference amplifier. A spectrum analyser is used to measure the noise figure of the amplifier.

Furthermore in WO 95/19574 it is previously known that switching means is used to disconnect the antenna from the amplifier section while connecting a low-loss transmission line to the antenna to measure the condition of the antenna.

SUMMARY OF THE INVENTION

In a receiver and a method for calibrating a receiver, which comprises one or more amplifiers in a chain, the gain of the receiver is variable in time and with temperature. It is of importance to know the gain of the receiver, for the whole system to work properly of which the receiver is only a small part.

It is an object of the present invention to provide a less expensive and more accurate apparatus for and method of performing calibration of the amplifiers preferably in an antenna installation.

Briefly, these and other objects of the present invention are accomplished by using a calibrating signal, preferable the noise generated by one or more amplifiers in the receiver as a reference source.

An advantage of the present invention is that an external reference source when calibrating the gain of a receiver can be avoided.

Another advantage of the present invention is possibility to monitor the gain of the receiver during operation.

Other objects, advantages and novel features of the invention will become apparent from the following detailed description of the invention when considered in conjunction with the accompanying drawings and claims.

DESCRIPTION OF THE DRAWINGS

For a better understanding, reference is made to the following drawings and preferred embodiments of the invention.

DESCRIPTION OF PREFERRED EMBODIMENTS

Figure 1:
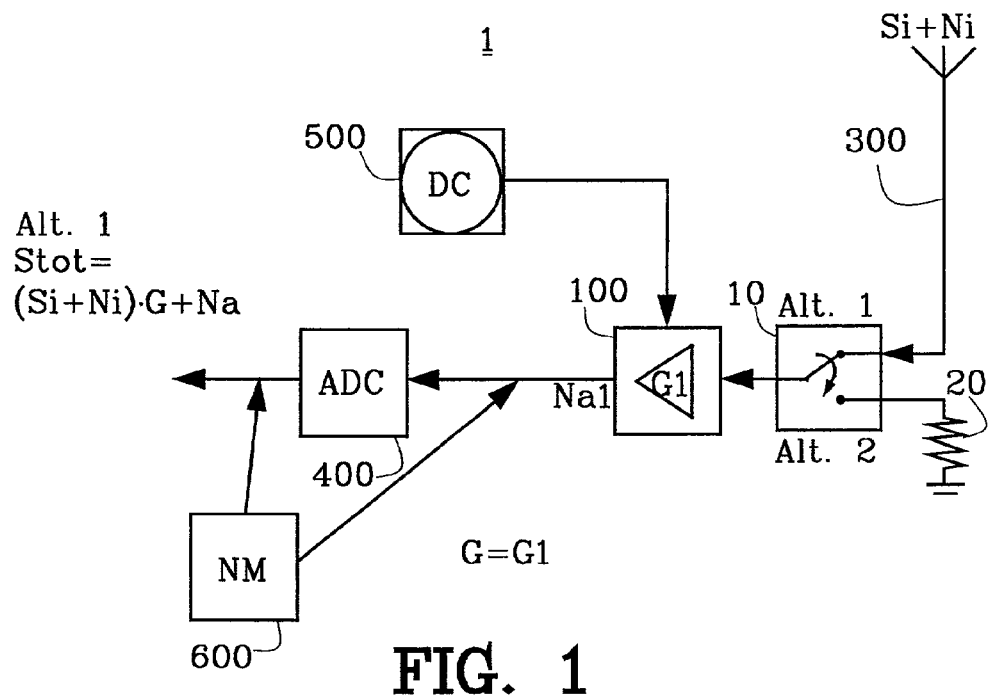
FIG. 1 illustrates an antenna receiver with one amplifier and a calibration arrangement according to the first embodiment of the invention.
Figure 2:
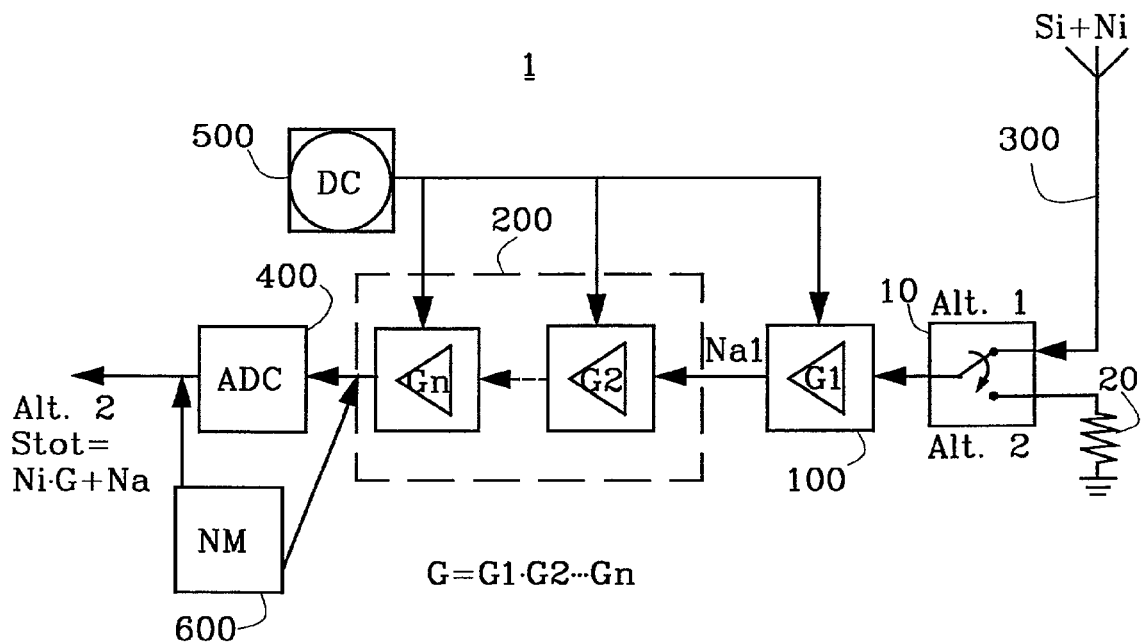
FIG. 2 illustrates an antenna receiver with amplifiers in a chain and a calibration arrangement according to the first embodiment of the invention.
Figure 3:
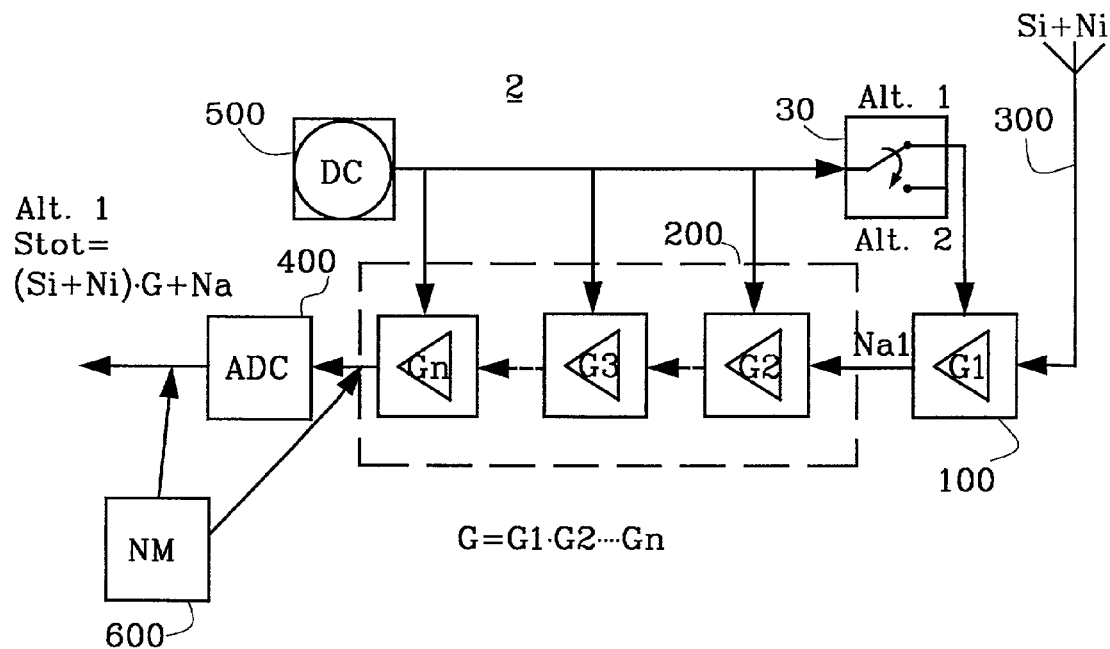
FIG. 3 illustrates an antenna receiver, during normal operation, with amplifiers in a chain and a calibration arrangement according to the second embodiment of the invention.
Figure 4:
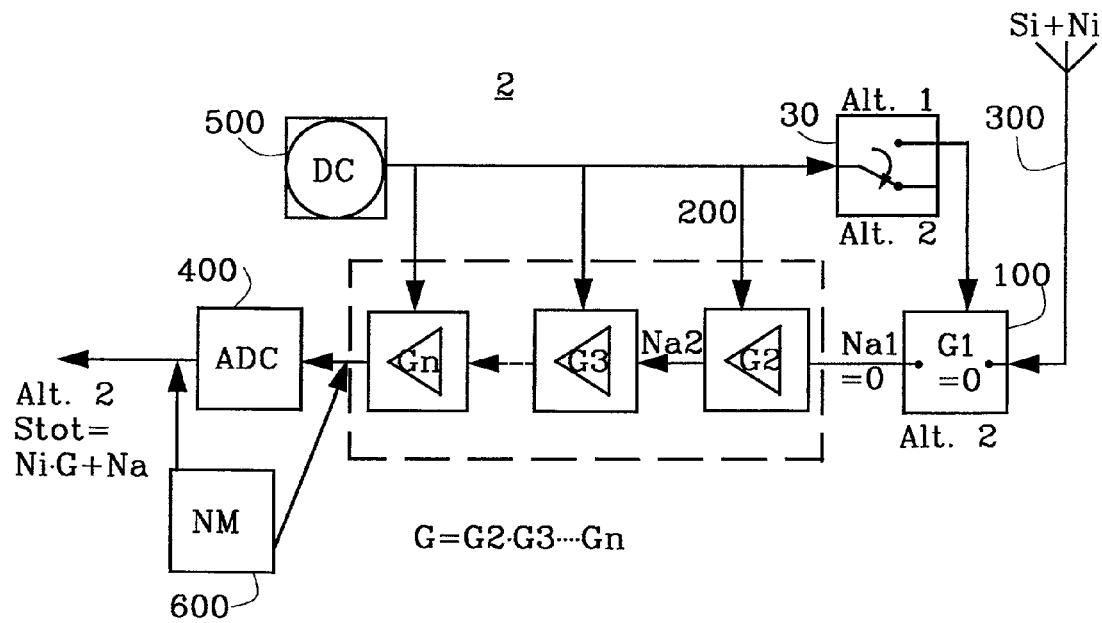
FIG. 4 illustrates an antenna receiver, during calibration, with amplifiers in a chain and a calibration arrangement according to the second embodiment of the invention.

FIGS. 1 and 2 represent a first embodiment 1 of the present invention, an antenna receiver calibrating arrangement, while FIGS. 3 and 4 represent a second embodiment 2 of the present invention.

In FIGS. 1–4 the antenna receiver comprises an antenna with one or more amplifiers located in a chain, wherein the noise $N_a+N_i$ produced by the amplifier/amplifiers 100/200 can be a reference value during estimation of the gain G of the receiver embodiments 1 or 2. Signal loss due to aging of the components and ambient variations as e.g., temperature can thereby be compensated.

In the first embodiment 1 of present invention, FIG. 1, of the receiver one amplifier 100 is connected between a receiving antenna 300 and an analog-digital-converter 400. With a switch 10 the input to the single amplifier 100 is connected to a reference potential, preferably through a resistance 20 to ground (of approx. 50 Ohm). In FIG. 2, the first embodiment 1 is illustrated where more than one amplifier is used in a chain 100 plus 200. The amplifier 100 closest to the receiving antenna 300 is connected to a reference potential, as in FIG. 1, preferably through a resistance 20 to ground (of approx. 50 Ohm). The resistance 20 in FIGS. 1 and 2 (of approx. 50 Ohm) is provided to prevent the amplifier/amplifiers from oscillating.

With the switch 10 connected to the reference potential via the resistance 20, Alt. 2 in FIGS. 1 or 2, no input signal $S_i$ or input noise $N_i$, at the antenna 300 is input to the amplifier/amplifiers 100/200. In that case there is an inherent noise $N_a$ from the amplifier/amplifiers 100/200 and an input noise $N_i$ produced by the resistance 20 instead of the antenna, in Alt. 1, that are the cause of a total output signal $S_{tot}$ ($=S_o+N_o=S_i \cdot G+N_i \cdot G+N_a$) before and after the ADC, depending on where the total output signal $S_{tot}$ is measured. Amplifiers generate a noise $N_a$ even if there is no input signal $S_i$ ($=0$); i.e. the level of noise present is always above zero.

It is not necessary a resistance that is placed between the amplifier/amplifiers and ground, it may e.g., be a filter or impedance.

The noise figure F is a method of specifying the noise performance of a circuit or a device. The definition of the noise figure F of a circuit is $$F = \frac{S_i/N_i}{S_o/N_o};$$

where
$S_i$=input signal;
$N_i$=input noise signal;
$S_o$=output signal;
$N_o$=output noise signal.

The noise figure F is usually expressed in decibel and F can be interpreted as a direct signal-to-noise ratio degradation. Noise output $N_o$ consists of the input noise $N_i$ which is the noise transmitted from the source resistance and the inherent noise $N_a$ which is the noise from the circuit itself. The noise $N_i$ is mostly arising from random electron motion, which is called thermal noise. It is directly proportional to the bandwidth B of the noise, the Boltzman constant k, and the temperature T. The amount of thermal noise to be found in a bandlimited system is (or the noise power is)

k·T·B (W);

where
k=Boltzman constant ($1.4 \times 10^{-23}$ J/K);
T=absolute temperature (K, Kelvin) of thermal noise;
B=bandwidth of the noise (Hz).

In a simple circuit with an input signal $S_i$ with input noise $N_i$ coupled to an amplifier with a gain G and an inherent noise $N_a$ and output signal $S_o$ ($=S_i \cdot G$) the noise figure F is equal to $$F = \frac{S_i/N_i}{S_o/N_o} = \frac{S_i/N_i}{S_1 \cdot G/(N_i \cdot G + N_a)} = 1 + \frac{N_a}{N_i \cdot G};$$

$$\Rightarrow N_a = N_i \cdot G(F-1).$$

For a system of amplifiers connected in a chain as in the invention a general relationship of the noise figures would be $$F = F_1 + \frac{F_2-1}{G_1} + \frac{F_3-1}{G_1 \cdot G_2} + \ldots + \frac{F_n-1}{G_1 \cdot G_2 \ldots G_{n-1}};$$

where F is the total noise figure of the whole chain of amplifiers and $F_1, \ldots, F_n$ is the noise figure of the resp. amplifier and $G_1, \ldots, G_n$ is the gain of resp. amplifier.

In the first embodiment 1 of present invention, Alt. 1, FIG. 2 when not in calibrating mode and when the actual input signal is $S_i$ the total output signal $S_{tot}$ is equal to $S_{tot}=S_i \cdot G_1 \ldots G_n+N_i \cdot G_1 \ldots G_n+N_{a1} \cdot G_n \ldots +N_{a2} \cdot G_3 \ldots G_n+ \ldots ++N_{a(n-1)} G_n+N_{an}.$ In the first embodiment 1 of present invention, Alt. 2, according to FIG. 2, there is no input signal $S_i$ to the amplifiers since the switch 10 is connected to the reference potential 20. The noise power $N_i$ is then input from the resistance 20 and potential reference, and the amplifiers produce an inherent noise $N_a$, total output signal $S_{tot}$ is then equal to $S_{tot}=N_i \cdot G_1 \ldots G_n+N_{a1} \cdot G_2 \ldots G_n+G_{a2} \cdot G_3 \ldots G_n+N_{an};$ $\Rightarrow S_{tot}=N_i \cdot G+N_a;$ when $$N_a = \left(N_{a1} \cdot \frac{1}{G_1} + N_{a2} \cdot \frac{1}{G_1 \cdot G_2} + \ldots + N_{an} \cdot \frac{1}{G_1 \ldots G_n}\right) \cdot G;$$

and $$G = G_1 \ldots G_n;$$

where $N_{a1}, \ldots, N_{an}$ is the inherent noise $N_a$ of the resp. amplifier and $G_{a1}, \ldots, G_{an}$ is the gain G of resp. amplifier. The incoming noise signal $N_i$ is in this case the noise produced in the resistance 20 instead of the noise signal $N_i$ coming from the antenna 300.

These equations are also valid when only one amplifier as in FIG. 1 is used, but then is total output signal $S_{tot}$ equal to $$S_{tot} = N_i \cdot G_1 + N_{a1};$$

$$\Rightarrow S_{tot} = N_i \cdot G + N_a; \text{ when}$$

$$N_a = N_a; \text{ and}$$

$$G = G_1.$$

With the assumption that the input noise $N_i$ is mostly arising from random electron motion, thermal noise, and using the earlier derived equation for inherent noise $N_a$ $(=N_i \cdot G(F-1))$ for a simple circuit, and the expression for the amount of thermal noise found in a bandlimited system $(=k \cdot T \cdot B)$, an equation can be derived for the total output signal $S_{tot}$, in Alt. 2, for one amplifier in embodiment 1, FIG. 1

$$S_{tot} = N_i \cdot G + N_a =$$

$$N_i \cdot G + N_i \cdot G \cdot (F-1) = N_i \cdot G \cdot F = k \cdot T \cdot B \cdot F \cdot G \Rightarrow G = \frac{S_{tot}}{k \cdot T \cdot B \cdot F}.$$

The total output signal $S_{tot}$ in the first and second embodiment 1 and 2 from the analog-digital-converter 400 is measured with a noise meter 600 either after the analog-digital-converter 400 or before, right after the last amplifier 200, and by means of the input noise power $N_i$ $(=k \cdot T \cdot B)$, a measured temperature T of the receiver, the bandwidth B of the noise power, the Boltzman constant k, and a known noise figure F of the amplifier the gain G of the receiver can be estimated from the equation $$G = \frac{S_{tot}}{k \cdot T \cdot B \cdot F}.$$

In this connection, Alt. 2, for both the embodiment 1 and 2 the assumption is used that variation in noise figure F over ambient temperature T is smaller than the variation in gain G.

A switch 10 as used in the first embodiment 1 of the present invention, FIGS. 1 and 2, produces an insertion loss which increases the noise figure F, and which decreases the sensitivity of the receiver during normal operation, Alt. 1.

A second embodiment 2, of the present invention, according to FIGS. 3 and 4 which does not increase the noise figure F during normal operation is suggested.

In the second embodiment 2 of the receiver, FIGS. 3 and 4, which does not increase the noise figure F during normal operation, no switch 10 as in FIGS. 1 and 2 is used. Instead, the amplifier 100 closest to the receiving antenna 300, in FIG. 4, is disconnected 30 by that no power, DC supply 500, is supplied to the amplifier 100. The amplifier 100 itself works as a switch, which means that this amplifier 100 is working as an interruption with no gain $G_1$ and disconnects the other amplifiers 200 from the signal source $S_i$. The remaining amplifiers 200 are producing a noise power $N_{a2} \ldots N_{an}$ as in the first solution. The amplifier 100 working as a switch is not producing an inherent noise $N_{a1}$, and has no gain $G_1$, but is producing the input noise $N_i$ corresponding to the input noise produced by the reference potential 20 in embodiment 1, Alt. 2. In Alt. 1 for both embodiment 1 and 2 the input noise $N_i$ is produced by the "input termination", the antenna. As the "switch amplifier" has no gain $G_1$ and is not producing an inherent noise $N_{a1}$ in Alt. 2, embodiment 2, FIGS. 3 and 4, a single amplifier 100 as is illustrated in FIG. 1 for the first embodiment 1 can not be used in Alt. 2 when estimating the gain G of the receiver. Conclusion is for embodiment 2 that at least more than one amplifier in a chain is needed for the invention to work in calibrating mode Alt. 2.

There is no need to connect a reference potential 20 (a resistance to ground of approx. 50 Ohm) to prevent the amplifiers from oscillating. The DC power supplies of the various amplifiers 100–200 are separated, or as shown in FIGS. 3 and 4, one DC supply 500 to all amplifiers, but amplifier 100 is disconnected from the DC supply by a switch 30.

In second embodiment 2 of present invention, Alt. 1, when not in calibrating mode, the total output signal $S_{tot}$ is equal to $$S_{tot} = S_i \cdot G_1 \ldots G_n + N_i \cdot G_1 \ldots G_n + N_{a1} \cdot G_2 \ldots$$
$$G_{n+} + \ldots + N_{a(n-1)} \cdot G_n N_{an}.$$

In second embodiment 2 of present invention, Alt. 2, according to FIG. 4, in the case when there is no input signal $S_i$ to the amplifiers, the "switch amplifier" 100 is working as an interruption, the noise power $N_i$ is input from the "switch amplifier" 100, and the amplifiers 200 produce an inherent noise $N_a$.

The "switch amplifier" 100 produce no inherent noise $N_{a1}$, total output signal $S_{tot}$ is then equal to $$S_{tot} = N_i \cdot G_2 \ldots G_n + N_{a2} \cdot G_3 \ldots G_n + \ldots + N_{a(n-1)} \cdot G_n + N_{an};$$

$$\Rightarrow S_{tot} = N_i \cdot G + N_a; \text{ when}$$

$$N_a = $$

$$\left( N_{a2} \cdot \frac{1}{G_2} + N_{a3} \cdot \frac{1}{G_2 \cdot G_3} + \ldots + N_{a(n-1)} \cdot \frac{1}{G_1 \ldots G_{(n-1)}} + N_{an} \cdot \frac{1}{G_2 \ldots G_n} \right) \cdot G;$$

and $$G = G_2 \ldots G_n.$$

where $N_{a2}, \ldots, N_{an}$ is the inherent noise $N_a$ of the resp. amplifier and $G_{a2}, \ldots, G_{an}$ is the gain G of resp. amplifier. Instead of the incomming noise signal $N_i$ from the antenna is an input noise $N_i$ produced by the switch amplifier 100 in Alt. 2.

From the equation $$G = \frac{S_{tot}}{k \cdot T \cdot B \cdot F};$$

derived from embodiment 1, Alt. 2, with one amplifier, it is possible to estimate the gain G for more than one amplifier in a chain for embodiment 1 and 2 Alt. 2. With a noise meter 600 is measured the total output signal $S_{tot}$ in the first and second embodiment 1 and 2. Input to the equation is this measured total output signal $S_{tot}$ and the measured temperature T of the receiver, the bandwidth B of the noise, and the Boltzman constant k. From a known noise figure for each amplifier in the receiver is an approximation made of noise figure F for the whole receiver. By means of all this data is then the gain G ($=G_1 \ldots G_n$) for the whole receiver estimated (in embodiment 2 is the gain G equal to $G_{a2} \ldots G_{an}$, described above).

In the first embodiment 1, FIGS. 1 and 2, there is insertion loss due to a separate switch 10 which also affects the noise figure F during normal operation. In the second embodiment 2, FIG. 3 or 4, the amplifier closest to the receiving antenna is the switch 100 in itself. However, in the second embodiment 2, where at least one amplifier is disconnected (at least more than one amplifier in a chain is needed for the invention to work in calibrating mode Alt. 2), working as an interruption, the gain G of this amplifier is not included in the calibration. The accuracy of the gain G estimation of the total receiver is thereby reduced with the gain inaccuracy of the switched off amplifier. The noise figure F of the receiver is also affected in embodiment 2, Alt. 2, it is increased.

It is preferable that the gain of the switched off amplifier stage 100 is as low as possible. This is to keep the accuracy of the gain G measurements on a high level.

With a high gain amplifier 100 disconnected in the second embodiment 2 according to FIG. 3 or 4 this high level accuracy is not achieved. This is also an answer to why the accuracy is decreased if only two amplifiers and not a chain of many amplifiers 100 plus 200 are used in a receiver in the second embodiment 2. If two amplifiers existing and one is disconnected it will affect the normal operation more than if one amplifier out of a chain of many amplifiers is disconnected.

A solution to this problem in the second embodiment 2 in a receiver is to provide a low gain amplifier in a chain of amplifiers closest to the antenna and to let this low gain amplifier be the disconnected amplifier.

For a receiver it is preferable, for best operation of the receiver, to provide a high gain amplifier next to the antenna. A high gain amplifier is often delivered in a packaged chip consisting of more than one amplifier stage. The amplifiers stages in the chip in series produce a high gain. There is normally only one power supply per chip, the same to all of the amplifiers stages. If you disconnect the whole chip to use it as a switch, as it is impossible to separate the series coupled amplifiers in one chip with only one power supply, it results in a high gain amplification being disconnected (at least more than one amplifier in a chain is needed for the invention to work in calibrating mode Alt. 2, this means that beside the high gain amplifier in one chip another amplifier is needed). A solution to a high gain amplifier in chip of series coupled lower gain amplifier stages would be to get a chip in the future in which the first amplifier stage has its own power supply pin. If that chip existed no power supply would be fed to the first amplifier in the series coupled amplifiers on the chip, and the chip of high gain would be disconnected from the antenna, the input signal, and the second embodiment 2 of the invention is reached, but with improved accuracy of gain estimation.

In the future for any reason it may be of favor to provide the reference potential 20 in the first embodiment 1, or the switch amplifier 100 in the second embodiment 2 somewhere in the chain of amplifiers and not closest to the antenna 300 as described previously.

Allowing a short disconnect time of the input signal from the amplifier/amplifiers the calibration can be carried out during operation.

An antenna and/or amplifiers can carry signals of different carrier frequencies, it is advised to calibrate all receiver chains making use of that disconnected antenna at the same time. This can be done by means of a divider whose input is connected to the last amplifier stage and whose output are connected to the different carrier frequency amplifiers.

In accordance with another aspect of the invention, there is provided a method for calibrating the receiver, wherein the receiver comprises one or more amplifiers in a chain. The amplifier/amplifiers 100/200 are generating a noise signal $N_a+N_i$ at the same time as an input signal $S_i+N_1$ is disconnected Alt. 2 to the receiver. The noise signal is used as a calibrating signal for estimating a corresponding gain (G) of the receiver, by measuring (600) at the output of the receiver the amount of noise ($S_{tot}$) of the amplifier/amplifiers in the chain. The gain (G) is adjusted in accordance to the calibrating signal.

The invention claimed is:

1. A method for calibrating one or more amplifiers (100, 200) comprising the steps of:
    i) generating a noise signal ($N_a+N_i$) produced by said one or more amplifiers (100,200) when no input signal ($S_i+N_i$) is connected (Alt. 2) to at least one amplifier of said one or more amplifiers (100,200); and
    ii) using said noise signal ($N_a+N_i$) as a calibrating signal for estimating a corresponding gain (G) of said one or more amplifiers (100,200) by measuring (600) at at least one output of said one or more amplifiers (100, 200) the amount of noise ($S_{tot}$) of said one or more amplifiers (100,200), whereby said one or more amplifiers can be calibrated using said calibrating signal as a reference signal.

2. A method for calibrating one or more amplifiers (100, 200) according to claim 1, wherein said gain (G) is further adjusted in accordance with said calibrating signal.

3. A method for calibrating a receiver (1,2) comprising the steps of:
    i) generating a noise signal ($N_a+N_i$) produced by one or more amplifiers (100,200) of said receiver when an input signal ($S_i+N_i$) is disconnected (Alt. 2) from said receiver; and
    ii) using said noise signal ($N_a+N_i$) as a calibrating signal for estimating a corresponding gain (G) of said one or more amplifiers in said receiver by measuring (600) at the output of the receiver the amount of noise ($S_{tot}$) of said one or more amplifiers (100,200), whereby said one or more amplifiers can be calibrated using said calibrating signal as a reference signal.

4. A method for calibrating a receiver according to claim 3, wherein said gain (G) is further adjusted in accordance with said calibrating signal.

5. A calibration arrangement (1,2) comprising:
    one or more amplifiers (100,200) for amplifying a radio signal ($S_i+N_i$);
    estimating means (600) for estimating a gain (G) of said one or more amplifiers (100,200);
    disconnecting said radio signal ($S_i+N_i$), while at least one amplifier of said one or more amplifiers (100,200) is producing a calibrating signal ($N_a+N_i$) as a reference signal into said estimating means (600) for estimating said gain (G) of said radio signal ($S_i+N_i$), wherein said calibrating signal is a function of a noise signal.

6. A calibration arrangement (1,2) according to claim 5, wherein said calibrating signal is a pure noise signal ($N_a+N_i$) of at least one amplifier of said one or more amplifiers (100,200).

7. A calibration arrangement (1) according to claim 5, wherein disconnecting said one or more amplifiers (100, 200) from said radio signal ($S_i+N_i$ by connecting at least one input of said one or more amplifiers (100,200) to a reference potential (20).

8. A calibration arrangement (1) according to claim 7, wherein said reference potential is provided by a resistance (20) connected to ground.

9. A calibration arrangement (1,2) according to claim 5, wherein the calibration arrangement (1,2) further comprises:
more than one amplifier (100+200) in a chain for amplifying said received radio signal ($S_i+N_i$).

10. A calibration arrangement (1,2) according to claim 5, wherein said calibrating signal represents a noise power (kTBF) from said one or more amplifiers (100,200) that comprises:
a known Boltzman constant (k);
a known bandwith (B) of said noise power;
a known noise figure of said noise power;
a measured temperature (T) of said receiver.

11. A calibration arrangement (12) according to claim 5, an output from the last one of said one or more amplifiers (100,200) in a chain is connected to an analog-digital-converter (400) for converting analog signals into digital signals.

12. A calibration arrangement (1,2) according to claim 11, wherein said gain (G) of said radio signal ($S_i+N_i$) is estimated from said calibrating signal ($N_a+N_i$) when an output signal ($S_{tot}$) is measured after said analog-digital-converter (400).

13. A calibration arrangement (1,2) according to claim 10, wherein said gain (G) of said radio signal ($S_i+N_i$) is estimated from said calibrating signal ($N_a+N_i$) including said noise power (kTBF) when an output signal ($S_{tot}$) is measured at at least one output of said one or more amplifiers (100,200).

14. A calibration arrangement (1,2) according to claim 5, wherein said gain (G) of said radio signal ($S_i+N_i$) is estimated from said calibrating signal ($N_a+N_i$) when an output signal ($S_{tot}$) is measured at at least one output of said one or more amplifiers (100,200).

15. A calibration arrangement (1,2) comprising:
one or more amplifiers (100,200) for amplifying a radio signal ($S_i+N_i$);
estimating means (600) for estimating a gain (G) of said one or more amplifiers (100,200);
wherein said calibration arrangement (1,2) further comprises;
a switching means (10,30+100) for disconnecting said radio signal ($S_i+N_i$), while at least one amplifier of said one or more amplifiers (100,200) is producing a calibrating signal ($N_a+N_i$) as a reference signal into said estimating means (600) for estimating said gain (G) of said radio signal ($S_i+N_i$), wherein said calibrating signal is a function of a noise signal.

16. A calibration arrangement (1) according to claim 15, wherein said switching means (10) is disconnecting said one or more amplifiers (200) from said radio signal ($S_i+N_i$) by connecting at least one input of said one or more amplifiers (100,200) to a reference potential (20).

17. A calibration arrangement (1,2) according to claim 15, wherein said switching means (10,30+100) is disconnecting said one or more amplifiers (100,200) from said radio signal ($S_i+N_i$) by disconnecting at least one input of said one or more amplifiers (100,200) which is closest to an input of said radio signal ($S_i+N_i$).

18. A receiver (1,2) comprising;
means (300) for receiving a radio signal ($S_i+N_i$):
one or more amplifiers (100,200) for amplifying said received radio signal ($S_i+N_i$);
estimating means (800) for estimating a gain (G) of said receiver (12);
wherein said receiver further comprises:
a switching means (10,100) for disconnecting said received signal ($S_i+N_i$), while at least one amplifier of said One or more amplifiers (100,200) is producing a calibrating signal ($N_a+N_i$) as a reference signal to said estimating means (600) for estimating said gain (G) of said radio signal ($S_i+N_i$), wherein said calibrating signal is not the output of an oscillator.

19. A receiver (1,2) according to claim 18, wherein said calibrating signal is a pure noise signal ($N_a+N_i$) of at least one amplifier of said one or more amplifiers (100,200).

20. A receiver (1) according to claim 18, wherein said switching means (10) is disconnecting said radio signal ($S_i+N_i$) by connecting at least one input of said one or more amplifiers (100) to a reference potential (20).

21. A receiver (1) according to claim 20, wherein said reference potential is provided by a resistance (20) connected to ground.

22. A receiver (12) according to claim 18, wherein the receiver (1,2) further comprises:
more than one amplifier (100+200) in a chain for amplifying said received radio signal ($S_i+N_i$).

23. A receiver (1,2) according to claim 18, wherein said calibrating signal represents a noise power (kTBF) from said one or more amplifiers (100,200) that comprises:
a known Boltzman constant (k);
a known bandwith (B) of said noise power;
a known noise figure of said noise power;
a measured temperature (T) of said receiver.

24. A receiver (1,2) according to claim 23, wherein said gain (G) of said received radio signal ($S_i+N_i$) is estimated from said calibrating signal ($N_a+N_i$) including said noise power (kTBF) when an output signal ($S_{tot}$) is measured at at least one output of said one or more amplifiers (100,200).

25. A receiver (1,2) according to claim 18, wherein an output from the last one of said one or more amplifiers (200) in a chain is connected to an analog-digital-converter (400) for converting analog signals into digital signals.

26. A receiver (1,2) according to claim 25, wherein said gain (G) of said received radio signal ($S_i+N_i$) is estimated from said calibrating signal ($N_a+N_i$) when an output signal ($S_{tot}$) is measured after said analog-digital-converter (400).

27. A receiver (1,2) according to claim 18, wherein said gain (G) of said received radio signal ($S_i+N_i$) is estimated from said calibrating signal ($N_a+N_i$) when an output signal ($S_{tot}$) is measured at at least one output of said one or more amplifiers (100,200).

28. A calibration arrangement (1,2) comprising:
one or more amplifiers (100,200) for amplifying a radio signal ($S_i+N_i$);
estimating means (600) for estimating a gain (G) of said one or more amplifiers (100,200);
disconnecting said radio signal ($S_i+N_i$), while at least one amplifier of said one or more amplifiers (100,200) is producing a calibrating signal ($N_a+N_i$) as a reference signal into said estimating means (600) for estimating said gain (G) of said radio signal ($S_i+N_i$), wherein disconnecting said one or more amplifiers (100,200)

from said radio signal ($S_i+N_i$) by disconnecting a power supply (500) from at least one amplifier of said one or more amplifiers (100,200).

29. A calibration arrangement (1,2) comprising:

one or more amplifiers (100,200) for amplifying a radio signal ($S_i+N_i$);

estimating means (600) for estimating a gain (G) of said one or more amplifiers (100,200);

wherein said calibration arrangement (1,2) further comprises:

a switching means (10,30+100) for disconnecting said radio signal ($S_i+N_i$), while at least one amplifier of said one or more amplifiers (100,200) is producing a calibrating signal ($N_a+N_i$) as a reference signal into said estimating means (600) for estimating said gain (G) of said radio signal ($S_i+N_i$), wherein said switching means (30+100) is disconnecting said one or more amplifiers (200) from said radio signal ($S_i+N_i$) by disconnecting a power supply (500) from at least one amplifier of said one or more amplifiers (100,200).

30. A receiver (1,2) comprising:

means (300) for receiving a radio signal ($S_i+N_i$);

one or more amplifiers (100,200) for amplifying said received radio signal ($S_i+N_i$):

estimating means (600) for estimating a gain (G) of said receiver (12);

wherein said receiver further comprises:

a switching means (10,100) for disconnecting said received signal ($S_i+N_i$), white at least one amplifier of said one or more amplifiers (100,200) is producing a calibrating signal ($N_a+N_i$) as a reference signal to said estimating means (600) for estimating said gain (G) of said radio signal ($S_i+N_i$), wherein said switching means (100) is disconnecting said one or more amplifiers (100,200) from said radio signal ($S_i+N_i$) by disconnecting a power supply (500) from at least one amplifier of said one or more amplifiers (100,200).

\* \* \* \* \*

UNITED STATES PATENT AND TRADEMARK OFFICE
CERTIFICATE OF CORRECTION

PATENT NO. : 7,054,602 B2  Page 1 of 2
APPLICATION NO. : 09/771977
DATED : May 30, 2006
INVENTOR(S) : van der Pol It is certified that error appears in the above-identified patent and that said Letters Patent is hereby corrected as shown below:

Title Page, item (56), under "U.S. PATENT DOCUMENTS", in Column 2, Line 2, delete "342/351" and insert -- 455/226.4 --, therefor.

Title Page, item (56), under "U.S. PATENT DOCUMENTS", in Column 2, Line 11, delete "6,763,227 B1" and insert -- 6,763,227 B2 --, therefor.

In Column 4, Lines 48-50 delete " $S_{tot}=S_i \cdot G_1 \ldots G_n + N_i \cdot G_1 \ldots G_n + N_{a1} \cdot G_n \ldots + N_{a2} \cdot G_3 \ldots G_n + \ldots + + N_{a(n-1)} \cdot G_n + N_{an}$ " and insert -- $S_{tot} = S_1 \cdot G_1 \cdots G_n + N_1 \cdot G_1 \cdots G_n + N_{a1} \cdot G_2 \cdots G_n + N_{a2} \cdot G_3 \cdots G_n + \cdots + N_{a(n-1)} \cdot G_n + N_{an}$ . --, therefor.

In Column 4, Lines 58-60, delete " $S_{tot}=N_i \cdot G_1 \ldots G_n + N_{a1} \cdot G_2 \ldots G_n + G_{a2} \cdot G_3 \ldots G_n + N_{an}$ ;"

and insert -- $S_{tot} = N_1 \cdot G_1 \cdots G_n + N_{a1} \cdot G_2 \cdots G_n + N_{a2} \cdot G_3 \cdots G_n + \cdots + N_{a(n-1)} \cdot G_n + N_{an}$ ; --, therefor.

In Column 5, Line 15, delete "$N_a = N_a$;" and insert -- $N_a = N_{a1}$; --, therefor.

In Column 5, Line 21, delete "$N_a(=N_iG(F-1)$" and insert -- $N_a(=N_iG(F-1))$ --, therefor.

In Column 6, Lines 26-27, delete " $S_{tot}=S_i \cdot G_1 \ldots G_n + N_i \cdot G_1 \ldots G_n + N_{a1} \cdot G_2 \ldots G_{n+1} \ldots + N a(n-1) \cdot G_n N_{an}$ ."

and insert -- $S_{tot} = S_1 \cdot G_1 \cdots G_n + N_1 \cdot G_1 \cdots G_n + N_{a1} \cdot G_2 \cdots G_n + N_{a2} \cdot G_3 \cdots G_n + \cdots + N_{a(n-1)} \cdot G_n + N_{an}$ . --, therefor.

In Column 6, Line 45, delete " $(N_{a2} \cdot \frac{1}{G_2} + N_{a3} \cdot \frac{1}{G_2 \cdot G_3} + \cdots + N_{a(n-1)} \frac{1}{(G_2) \cdots G_{(n-1)}} + N_{an} \cdot \frac{1}{G_2 \cdots G_n})$ " and insert -- $(N_{a2} \cdot \frac{1}{G_2} + N_{a3} \cdot \frac{1}{G_2 \cdot G_3} + \cdots + N_{a(n-1)} \cdot \frac{1}{G_2 \cdots G_{(n-1)}} + N_{an} \cdot \frac{1}{G_2 \cdots G_n}) \cdot G$ ; --, therefor.

In Column 6, Line 55, delete "incomming" and insert -- incoming --, therefor.

In Column 9, Line 7, in Claim 7, delete "$(S_i + N_i$" and insert -- $(S_i + N_i)$ --, therefor.

In Column 9, Line 25, in Claim 11, delete "(12)" and insert -- (1, 2) --, therefor.

In Column 9, Line 52, in Claim 15, delete ";" and insert -- : --, therefor.

UNITED STATES PATENT AND TRADEMARK OFFICE
CERTIFICATE OF CORRECTION

PATENT NO.         : 7,054,602 B2
APPLICATION NO. : 09/771977
DATED                : May 30, 2006
INVENTOR(S)       : van der Pol It is certified that error appears in the above-identified patent and that said Letters Patent is hereby corrected as shown below:

In Column 10, Line 4, in Claim 18, delete ";" and insert -- : --, therefor.

In Column 10, Line 5, in Claim 18, delete ":" and insert -- ; --, therefor.

In Column 10, Line 8, in Claim 18, delete "(800)" and insert -- (600) --, therefor.

In Column 10, Line 13, in Claim 18, delete "One" and insert -- one --, therefor.

In Column 10, Line 17, in Claim 18, delete "is not the output of an oscillator" and insert -- is a function of a noise signal --, therefor.

In Column 10, Line 28, in Claim 22, delete "(12)" and insert -- (1,2) --, therefor.

In Column 12, Line 4, in Claim 30, delete ":" and -- ; --, therefor.

Signed and Sealed this

Fifteenth Day of July, 2008

JON W. DUDAS
*Director of the United States Patent and Trademark Office*